United States Patent [19]

Hintz et al.

[11] 4,189,977
[45] Feb. 26, 1980

[54] WEATHER TIGHT BLIND FASTENER

[75] Inventors: Carman R. Hintz, Pittsburgh, Pa.; Warren K. Jahns, Chicago, Ill.

[73] Assignee: H. K. Porter Company, Inc., Pittsburgh, Pa.

[21] Appl. No.: 867,463

[22] Filed: Jan. 6, 1978

[51] Int. Cl.² ............................................. F16B 13/06
[52] U.S. Cl. ................................... 85/70; 85/36; 85/50 R; 85/72
[58] Field of Search .................... 85/70, 71, 72, 77, 78, 85/7, 8.8, 36, 1 JP, 50 R

[56] References Cited

U.S. PATENT DOCUMENTS

| | | | |
|---|---|---|---|
| 2,030,166 | 2/1936 | Huck | 85/70 X |
| 2,030,167 | 2/1936 | Miller | 85/70 |
| 2,324,142 | 7/1943 | Eklund | 85/70 X |
| 3,021,927 | 2/1962 | McKee | 85/70 X |
| 3,205,758 | 9/1965 | Fischer | 85/36 |
| 3,657,955 | 4/1972 | McKay | 85/70 |
| 3,718,068 | 2/1973 | Passer | 85/72 X |
| 3,796,124 | 3/1974 | Crosa | 85/36 |
| 3,840,974 | 10/1974 | Georgen et al. | 85/36 X |
| 3,851,559 | 12/1974 | Baude | 85/72 X |
| 4,033,222 | 7/1977 | Wilson | 85/72 |

*Primary Examiner*—Rodney H. Bonck
*Attorney, Agent, or Firm*—Robert D. Yeager

[57] ABSTRACT

A weather tight fastener, for joining two or more adjacent members, having a flanged sleeve member which is disposed through aligned openings in the members and a rod member having an enlarged end, engaging a portion of the tubular member for collapsing the unflanged end of the tubular member in a controlled fashion. The end of the rod member which is not enlarged, projects from the flanged end of the tubular member and is engaged by a holding plate which is slidable in one direction only. Disposed between the slidable holding plate and the exposed surface of the members to be joined are a rigid washer and a resilient washer which are necessary for proper setting and providing a secure weather tight seal. The rigid washer has a counterbore of the same general size as the flanged end of the sleeve. The steel washer is disposed with the flanged end of the sleeve nested in the counterbore. The rod member includes a breakneck groove portion which breaks away from the rod member when the fastener is secured in place. When set the rod member is drawn through the sleeve member and the slidable holding plate is forced down the rod member to engage a portion of the rod member beneath the breakneck groove. The slidable plate member thus securely holds the rod member within and in engagement with the sleeve member when the fastener is in place. The surfaces to be joined are thus held both by the collapsed sleeve and also by the slidable plate member acting through the steel washer, which engages the surface outside of the sleeve flange area.

27 Claims, 17 Drawing Figures

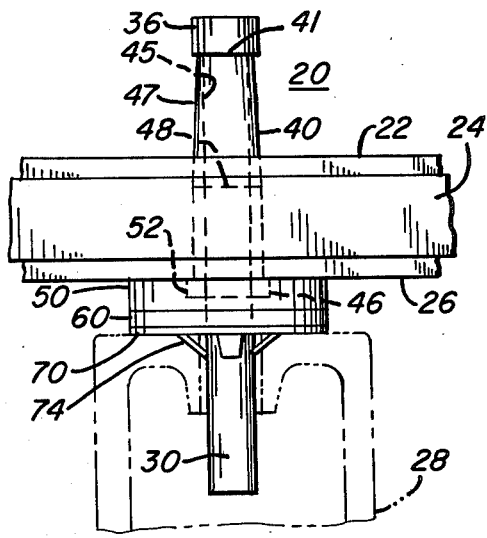
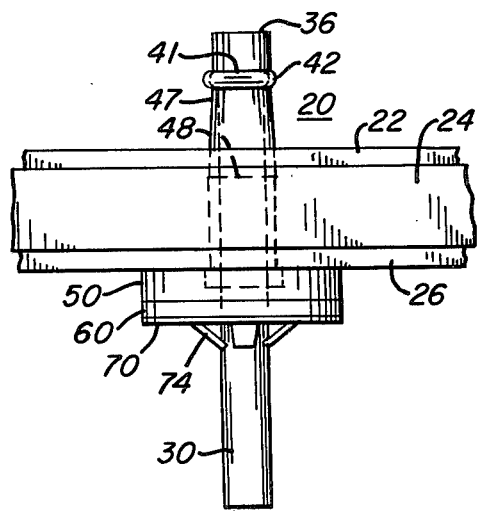
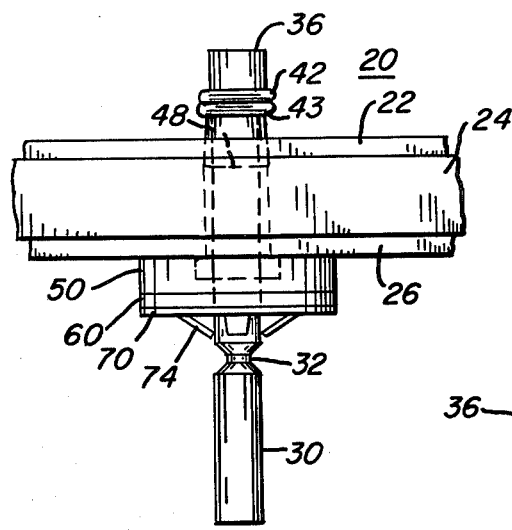
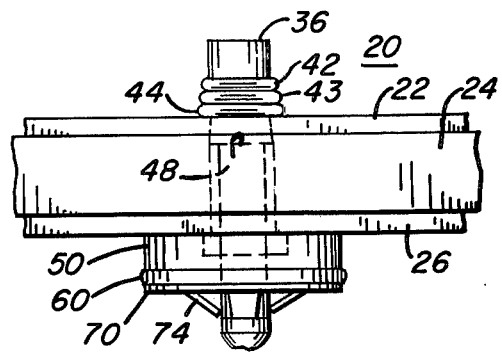
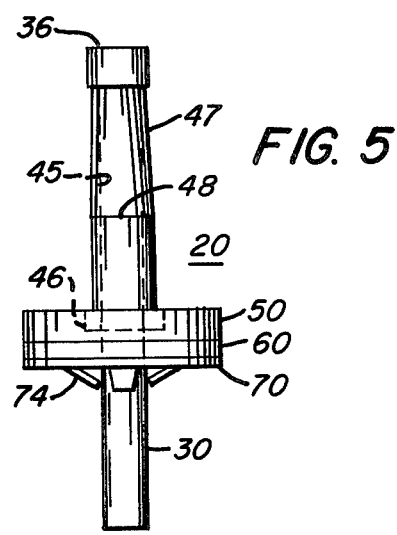

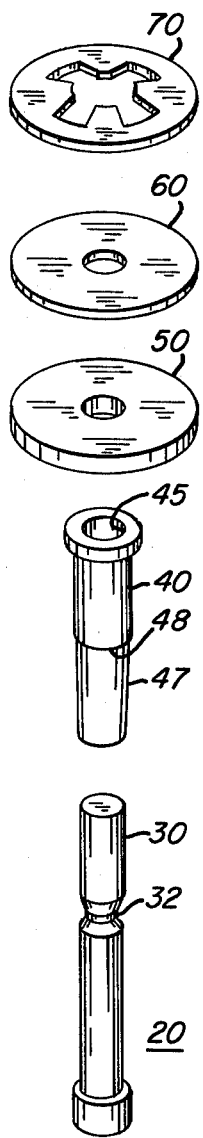
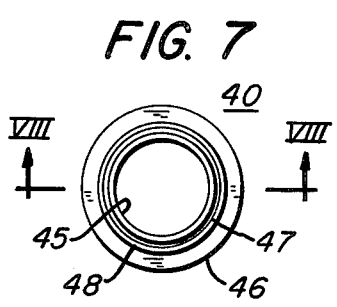
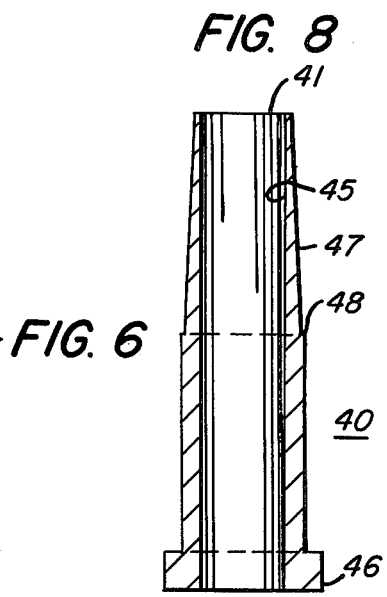
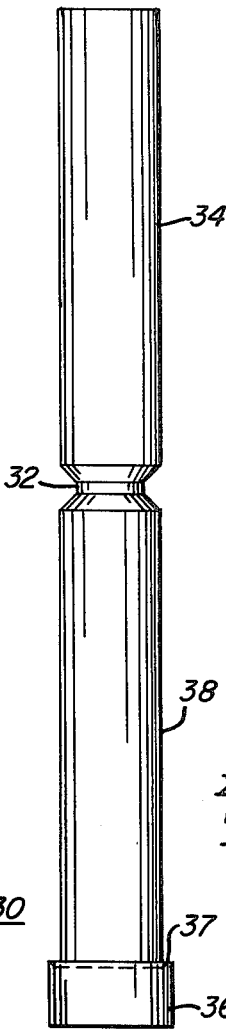
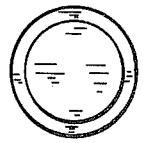
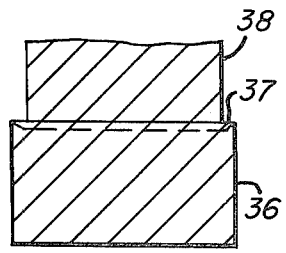
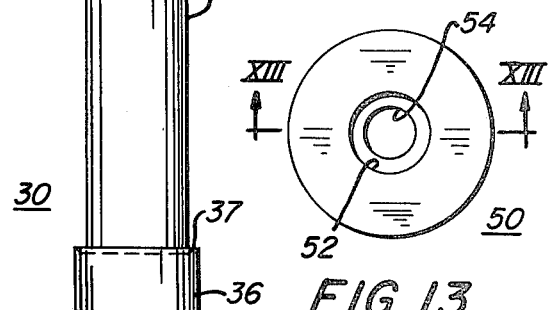
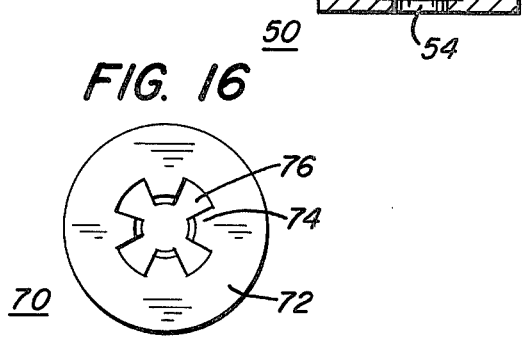
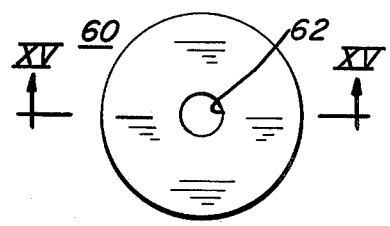
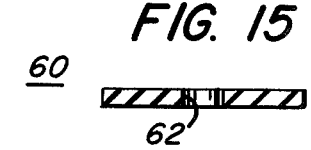
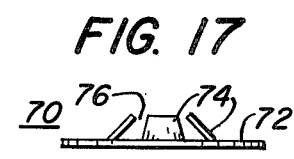

WEATHER TIGHT BLIND FASTENER

BACKGROUND OF THE INVENTION

1. Field of the Invention

The present invention relates to a blind fastener and more particularly to a weather tight blind fastener having a tubular member securing the pieces to be joined and a rod member also securing the pieces to be joined and held within the tubular member by a slidable plate member, a resilient washer and a rigid washer to provide a strong resilient weather tight fastener.

2. Description of the Prior Art

Blind fasteners are well-known in the prior art as exemplified by U.S. Pat. No. 2,030,166, U.S. Pat. No. 2,030,167, U.S. Pat. No. 2,501,567, and U.S. Pat. No. 3,232,162. These prior art patents utilize a flanged tubular member which is inserted through aligned holes in the items to be joined with the flanged head contacting one of the items. In U.S. Pat. Nos. 2,030,166 and 2,030,167 a headed rod member is disposed within a flanged tubular member with the headed portion contacting the unflanged end of the tubular member. When force is applied to the rod member the unflanged end of the tubular member collapses The flanged end of the female member has a rivet shaped head. The male member is held in the female member by a press fit with the female member. U.S. Pat. No. 2,030,166 teaches an undercut on the head of the rod member and collapsing of the tubular member into more than one pleat or bulb. When installed, the mandrel breaks at or beneath the head of the tubular member. In U.S. Pat. Nos. 2,501,567 and 3,232,162 a flanged tubular member is inserted through aligned holes in the items to be joined with the flanged head contacting one of the items. A rod member partially disposed in the hollow tubular member has an enlarged head which is drawn into the tubular member to expand the nonflanged end of the tubular member thus holding the items to be joined. In U.S. Pat. No. 2,501,567 the rod member is merely held in place by the frictional force when the blind fastener is installed. In U.S. Pat. No. 3,232,162 the rod member is rigidly held in place by metal flow from the hollow tubular member into a plurality of breakneck grooves formed on the rod member.

U.S. Pat. No. 3,851,559 illustrates a blind fastener which utilizes a radially expandable hollow cluster of helical filaments held together by their shape. When the cluster of filaments is axially compressed, the cluster undergoes, throughout the axial length, a uniform radial expansion. The filaments extending beyond the members joined spread, as a result of the axial compression, to hold the fastener in place.

Various types of threadless retaining plates are also disclosed in the prior art as exemplified by U.S. Pat. Nos. 3,205,758 and 3,796,124. U.S. Pat. No. 3,796,124 illustrates a circular plate fastening member, having a plurality of tongues, which is slidable in one direction only. This clamping member is not shown or suggested for use in combination with any type of blind rivet. The invention of U.S. Pat. No. 3,796,124 relates to a system for clamping corrugated sheet members to a rod of a roof structure. U.S. Pat. No. 3,205,758 teaches a threadless retaining plate constructed for use with a mandrel which is secured to a rigid backing or panel for holding an insulating blanket in place. A blind rivet is illustrated in this patent but merely for use in securing the mandrel to the panel backing. After the mandrels are secured by blind rivets to the panels, the insulating blanket is impaled over the mandrel and held in place by the threadless retaining plate, to which U.S. Pat. No. 3,205,758 is directed.

Although the blind fastener art is old and well developed there are still several problem areas. One problem is to provide a blind rivet which is easy to assemble and remains intact before installation. U.S. Pat. No. 2,030,166 suggests a press fit between the tubular member and the mandrel. This however requires close tolerance parts and complicates assembly. Another problem with prior art blind fasteners is that the items to be joined are held rigidly together only by the deformed tubular member. If the items being held loosen the deformed tubular member by expansion or movement they are no longer securely held in place but become somewhat loose. It is desirable to have a blind fastener wherein the members to be secured are resiliently held in place so that they will not become loose when slight movements occur. Slight movement can occur, especially in exterior fasteners, due to thermal expansion and contraction or due to other environmental variations. Yet another problem with some prior art blind fasteners is that the tubular member must be accurately sized to the length of the opening through the items. It is desirable to have a blind fastener which can accommodate a variety of material thickness without being specially sized. It is desirable to have a blind fastener wherein the sleeve or tubular member is deformed in a controlled fashion to secure various thickness materials and wherein the forming rod member is securely and resiliently held in place after installation to provide a weather tight seal and resilient holding of the members joined.

SUMMARY OF THE INVENTION

A blind fastener is disclosed utilizing a tubular member or sleeve, having one end flanged, which is inserted in aligned openings formed through the items to be joined, with the flange engaging one of the items. A headed rod member is partially disposed in the sleeve member; with the headed portion exposed on the unflanged end of the sleeve member. The rod member head has an annular surface formed thereon for engaging the unflanged end of the sleeve member. The sleeve member has a reduced diameter portion extending from a position intermediate the ends thereof to the unflanged end. A taper is formed on the reduced diameter portion extending from the start of the reduced diameter portion to the unflanged end. During installation of the blind fastener, the rod member, having the enlarged head portion, is partially drawn through the tubular member causing controlled collapse of the reduced diameter portion of the sleeve member. The reduced diameter portion of the sleeve member collapses in a controlled accordion fashion wherein the accordion pleats start at the unflanged end and are sequentially formed until contact with the items to be joined is made. It is an important feature of this invention that the plurality of the accordion pleats always start at the unflanged end of the sleeve member. If the pleats are not properly sequentially formed, the sleeve can rip or a poor joint can be formed.

In use, the flanged tubular member is inserted through openings in the parts to be joined, with the flanged end abutting one of the parts. The rod member or mandrel, which is partially disposed in the hollow tubular member, has an enlarged head portion formed at one end thereof defining an annular surface. The annular surface faces the unflanged end of the sleeve member. When the fastener is assembled, the annular surface engages the unflanged end of the sleeve member. The rod member has a breakneck groove formed therein so that when sufficient tensile strength is applied to the rod member, the rod member will separate into two parts. During installation the rod member is drawn through the sleeve with the annular portion of the headed end engaging the sleeve member. As the rod member is pulled, the unflanged end of the sleeve member collapses in a controlled accordion fashion forming a plurality of pleats. A holding plate member having a flat periphery and a plurality of tongues extending therefrom, the free ends of which define an opening through which the rod member can pass, is used for securing the rod member with respect to the tubular member. The slidable holding plate is slidable in one direction only and is moved along the rod member as the rod member is drawn partially from the sleeve member. The slidable holding plate is slid along the rod member towards the enlarged head portion, past the breakneck groove, to securely hold the rod member in place when the blind fastener is set. A steel washer is disposed around the rod member between the slidable holding plate member and the items to be joined. The steel washer has a counterbore formed therein configured to receive the flanged head of the sleeve member. The steel washer is relatively inflexible and transmits any force applied thereto to the flanged head of the sleeve when the fastener is being installed. The inclusion of the steel washer is an important aspect of the present invention since it permits a slidable plate member to be used and still insures proper setting of the blind rivet. Without using a rigid washer, it is difficult to properly collapse the sleeve member to form a tight connection. Sandwiched between the slidable plate member and the steel washer is a resilient plastic or rubber washer. This resilient washer has an opening formed therethrough for positioning around the rod member. The opening formed through the resilient washer is of a smaller diameter than the rod member so that a tight seal is provided therebetween, when the resilient member is forced onto the rod member. The flat periphery of the slidable plate member extends beyond the flanged portion of the tubular member to engage the resilient washer and transmit force therethrough to the rigid steel washer.

During installation, the outer periphery of the slidable plate member is held fixed while an axial force is applied to the rod member. The holding force is applied through the slidable plate member, the resilient washer and the steel washer to the flange of the tubular member. If the steel washer is not used the tubular member is not properly deformed and an inferior joint results. The tubular member is held fixed while the rod member is pulled. The sleeve collapses in a controlled fashion as the rod member moves. The holding force for the rod member is transferred to a larger area outside of the flanged end of the tubular member. With the rod member installed in place, and the portion beyond the breakneck groove separated, the slidable holding plate member securely retains the rod member within the tubular member for added strength of the blind fastener. The blind fastener thus has two means for holding the items to be joined together, (1) the deformed sleeve member and (2) the rod member in conjunction with the slidable plate member, the resilient washer and the rigid steel washer. The resilient washer is partially deformed when installed and provides a good weather tight seal between itself and the rod member.

The slidable holding plate member can be constructed with a flat annular surface from which a plurality of spaced-apart tongues extend radially inward. The area between the tongues can be approximately the same size and shape as the tongues. The tongues of the slidable plate member extend at an angle with respect to the flat planar peripheral portion. The free ends of the tongues define a circular opening through which the rod member can move in one direction. The circular opening defined by the tongues lies in a different plane than the flat periphery of the slidable plate member.

The flanged head of the tubular member is flat to fit a cylindrical counterbore formed in the steel washer. The depth of the counterbore is selected to be approximately the same as the thickness of the flanged head. When the flexible spacer or washer is installed between the slidable plate member and the rigid washer, it will generally fill the space between the tongues of the slidable plate member and be forced into tight contact with the rod member.

The blind rivet can be supplied assembled. The various parts will be held together by the rod member and the slidable plate member. The rivet can thus be handled as a unit before installation. Since the rod member and tubular member are not formed for a very tight fit, assembly of the rivet is simplified.

In one embodiment of the invention, the enlarged head is formed with an annular surface slightly larger in diameter than the free end of the sleeve member. The annular surface has a small undercut or bevel formed thereon for positioning the sleeve during installation. The sleeve member is formed with a decreased cross section portion starting intermediate the ends thereof, and a taper extending from the start of this decreased cross sectional area to the unflanged end thereof. The sleeve member thus has a minimum cross sectional area at the unflanged end thereof and increases in diameter towards the flanged end. Due to this construction when the blind fastener is installed the controlled accordion collapse of the sleeve member always starts to occur at the unflanged end thereof and the pleat type flanges sequentially occur until the items to be joined are grasped. Each successive pleat has a larger diameter than the last pleast formed. Thus, the pleat with the largest diameter is an engagement with the surface to be joined. This provides for a strong holding blind fastener.

The tubular member when set holds the items to be joined. The rod member sets the tubular member and through the slidable plate, the resilient washer and the rigid washer also holds the items to be joined. The slidable plate holds the rivet together before being installed and also resiliently holds the rod member in place when the rivet is set. The resilient washer provides a weather tight seal around the rod member. The flat rigid washer causes the tubular member to properly deform due to a force applied around the periphery of the rigid washer. When the tubular member is set, the rigid washer also transmits the holding force from the slidable plate member to an area outside of the tubular member flange.

It is an object of this invention to teach a blind fastener utilizing a flanged sleeve member having a tapered end which is deformed by a rod member having an enlarged head for controlled accordion collapse into a plurality of different diameter pleats.

It is an object of this invention to teach a blind fastener which utilizes both a deformed tubular member and a rod member for securely and resiliently joining items.

It is a further object of this invention to teach a blind fastener which utilizes a slidable plate member for holding the rod member within the tubular member to provide a resilient weather tight seal.

BRIEF DESCRIPTION OF THE DRAWINGS

For a better understanding of the invention, reference may be had to the preferred embodiments exemplary of the invention shown in the accompanying drawings, in which:

FIG. 1 is a side view of a blind fastener, inserted through three items to be joined, utilizing the teaching of the present invention;

FIG. 2 is a view similar to FIG. 1 but with the sleeve member partially collapsed into a first accordion pleat;

FIG. 3 is a side view similar to FIG. 1 but with the sleeve member collapsed into two accordion pleats;

FIG. 4 is a side view similar to FIG. 1 but with the sleeve member completely collapsed and in engagement with the members to be joined;

FIG. 5 is a side view of a blind fastener utilizing the teaching of the present invention;

FIG. 6 is an exploded view showing the disassembled blind fastener of FIG. 5;

FIG. 7 is a view of the sleeve member from the unflanged end;

FIG. 8 is a side section view of the sleeve member shown in FIG. 7 along the lines VIII—VIII;

FIG. 9 is a side view of the rod member;

FIG. 10 is an end view of the rod member;

FIG. 11 is an enlarged sectional view of the headed end of the rod member;

FIG. 12 is a view from the counterbore side of the rigid washer;

FIG. 13 is a section view of the rigid washer shown in FIG. 12 along the lines XIII—XIII;

FIG. 14 is a top view of the resilient washer;

FIG. 15 is a section view of the resilient washer shown in FIG. 14 along the line XV—XV;

FIG. 16 is a top view of the resilient plate member which is slidable in one direction only; and, FIG. 17 is a side view of the slidable plate member shown in FIG. 16.

DESCRIPTION OF THE PREFERRED EMBODIMENT

Referring now to the drawings there is shown a blind fastener 20 constructed according to the teaching of the present invention. Blind fastener 20 consists of five parts, a headed rod or mandrel 30, a flanged sleeve or tubular member 40, a steel washer 50 having a counterbore formed therein, a resilient washer 60 and a slidable plate fastener 70. FIG. 5 shows an assembled blind fastener 20 which is preferably sold as an assembled unit. The assembled blind fastener 20, unlike most prior art blind fasteners, can undergo rather rough handling without separating. Slidable plate 70 holds the blind fastener assembly 20 together even before the fastener 20 is installed. The blind fastener 20 can thus be shipped, stored and handled as a complete assembly. This feature provides for convenience when using blind fastener 20. Tubular member 40 and mandrel 30 are sizes so that assembly of fastener 20 is faciliated.

FIG. 1 shows the blind fastener 20 inserted through three members 22, 24 and 26 which are to be joined together. Items 22, 24 and 26 have openings formed therethrough which are aligned to receive fastener 20. A pulling tool 28 is shown in phantom. Pulling tool 28 is applied to blind fastener 20 to hold the sleeve 40, the steel washer 50, the resilient washer 60 and the slidable fastener 70 in a relatively fixed position while applying an axial force to rod member 30. Pulling tool 28 provides a holding force to the periphery of slidable plate 70, resilient washer 60 and rigid washer 50. This holding force is transmitted from the periphery of washer 50 to the tubular member 40. The setting force applied along the longitudinal axis of rod member 30 moves rod 30 and causes a controlled collapse of the unflanged end 41 of sleeve 40. The unflanged end 41 of sleeve member 40 collapses in an accordion fashion into a plurality of pleats 42, 43 and 44 when a relative axial force of sufficient strength is applied to rod member 30. The first pleat 42 is formed at the free unflanged end 41 of sleeve 40 as it collapses. As shown in FIG. 3, after the first pleat 42 is formed, a second pleat 43 is formed which is of slightly larger diameter. After the second pleat 43 is formed, a third pleat 44, as shown in FIG. 4, is formed which contacts one of the items 22, to be joined. Pleat 44 is larger in diameter than pleat 43. Thus as the blind fastener 20 is installed, pleats of increasing diameter are formed sequentially from the free end of sleeve 40. These pleats are formed until the item to be joined is contacted, at which time blind fastener 20 is securely set in place. As the axial force continues to be applied to rod member 30, rod member 30 breaks at breakneck groove portion 32. The completed fastener 20 as installed is shown in FIG. 4.

Referring now to FIGS. 7 and 8 there is shown a detailed drawing of the sleeve member 40 utilized in the preferred embodiment of the invention. FIGS. 7 and 8 are shown at an enlarged scale to facilitate explanation. Sleeve member 40 has a centerbore 45 formed therethrough. For a rod member 30 having a diameter of 0.308 inches, bore 45 has a diameter of 0.312 inches so that rod member 30 can pass easily therethrough and assembly of the rivet is easy. However, the fit between rod 30 and sleeve 40 is kept fairly snug so there is not undue movement. Sleeve 40 has a flange 46 formed at one end thereof. For the blind fastener as shown in FIGS. 1 through 5 flange 46 has a thickness of 0.109 inches and a diameter of 0.5 inches. The length of sleeve member 40 is 1 5/16 inches. The reduced diameter portion 47 starts intermediate the flanged end and the unflanged end of fastener 40. Reduced diameter portion 47 starts at circumference 48. Reduced diameter portion 47 is tapered with a ½° slope relative to the longitudinal axis. The reduced diameter portion 47 is approximately ½ inch long. The outer diameter of tubular member 40 between the flanged end 46 and the reduced diameter portion 47 is 0.372 inches. The outer diameter of the free end of reduced diameter portion 47 is 0.345 inches. The above dimensions are for a sleeve 40 formed from 1020 hot-rolled steel. Sleeve 40 can also be formed from 6061-T651 aluminum. When formed from aluminum the dimensions of sleeve 40 are somewhat different. When sleeve 40 is fabricated from aluminum, the reduced diameter portion 47 is longer. The tapered free end of tubular member 40 is easier to form than a reduced diameter portion which terminates in an enlarged end such as is shown in U.S. Pat. No. 2,030,166. The taper also assures that the pleats will always start where the tubular member 40 engages mandrel head 36, which is not the case with untapered sleeves.

By providing a tapered reduced diameter portion as shown and described, the accordion collapse of sleeve 40 will always start at the unflanged end 41 thereof with additional pleats being formed in sequence from the unflanged end 41. The disclosed construction prevents the first pleat from forming anywhere along sleeve 40 except at the free end of sleeve 40. If the first pleat forms at the face of the material being riveted, as is possible with an untapered sleeve 40, the rest of the sleeve may tear away as the head of the rod 30 continues to its full travel. Constructing the sleeve 40 as described assures a rivet 20 which is strong and will set correctly every time. Without the tapered reduced diameter portion 47, the pleats would start forming anywhere and this could cause problems. The taper 47 leaves the weakest part of the sleeve under the head of rod 30 so the accordion pleats must start there. The disclosed construction provides a better repetitive forming of the accordion pleats when the blind fastener 40 is set. A ½° taper relative to the longitudinal axis, on the end of the sleeve 40 allows the accordion pleats to start at the very end of the sleeve and continue one after the other until the material being riveted is reached. When the pleats are formed in this manner, later formed pleats are of a greater diameter and this adds to the rivet strength. Forming a plurality of pleats also allows a variety of materials having different thicknesses to be joined.

Referring now to FIGS. 9, 10 and 11 there is shown a detailed view of rod member 30. Rod member 30 comprises a breakneck groove 32, breakaway portion 34, a headed portion 36, and a main body portion 38. Except for breakneck groove 32, member 30 has a smooth surface along which plate member 70 can slide and grip. Blind rivet 20 can thus be assembled as shown in FIG. 5 with parts relatively securely held. Main body portion 38 is held within sleeve 40 when the blind fastener is set. Head 36 is of a slightly smaller diameter than the outer diameter of the portion of sleeve 40 between flange 46 and circumference 48. Head 36 has a diameter of approximately 0.370 inches. Head 36 defines an annular area 37 where it is formed from body portion 38. Annular surface 37 has a slight undercut of 5° as can best be seen in FIG. 11. This 5° undercut on annular surface 37 positions the free end 41 of sleeve 40 and assures that sleeve 40 is centered during its controlled collapse. The 5° undercut on angular surface 37 also assures that the free end 41 of sleeve 40 will collapse toward the longitudinal axis of the rod member 30 assuring that the head portion 36 will not pull into the centerbore 45 of the sleeve member 40. As an axial force is applied to rod member 30, sleeve 40 collapses in the controlled manner described above. As the axial force continues to be applied, rod 30 separates at breakneck groove portion 32 separating portion 34 from portion 38. Portion 38 is sized so that when rivet 20 is set it projects through flange 46. With the rivet set, portion 38 is held within sleeve 40 to increase strength and provide for a closed weather tight fastener. The force holding rod 30 within sleeve 40 is transferred outside of flange 46.

Flange 46 of sleeve 40 is flat on the top and bottom where it extends from the sleeve outer diameter. Steel washer 50 as best seen in FIGS. 12 and 13 is formed with a counterbore 52 for receiving the flanged head 46 of sleeve 40. Steel washer 50 has an opening 54 formed therethrough having an inner diameter of 0.315 inches for easily fitting over portion 34 and 38 of rod member 30. The depth of the counterbore in steel washer 50 is 0.109 inches which is approximately equal to the 0.109 inch depth of flange 46. The counterbore is dimensioned so that the force from resilient plate member 70 holding rod member 30 in place is transmitted to surface 26 outside of flange 46. The diameter of counterbore 52 is slightly greater than the diameter of flanged head 46. Thus, with the steel washer and sleeve fit over the rod 30 as shown in FIG. 5 the flanged head 46 of sleeve 40 fits within counterbore 52. The force applied to steel washer 50 when the blind fastener is set is thus transmitted to the flanged head 46 of sleeve 40. This provides for proper setting of sleeve 40 which would not occur without a rigid washer for transmitting force to flange 46.

On top of steel washer 50 a rubber flexible washer 60 is installed. Rubber washer 60, as shown in more detail in FIGS. 14 and 15, is disposed between slidable plate member 70 and steel washer 50. Flexible washer 60 can be formed of a suitable rubber or plastic material. Washer 60 has a central opening 62 formed therein through which a portion of rod member 30 can pass. For a rod member 30 having a diameter of 0.308 inches the diameter of center opening 62 would be approximately 0.25 inches. Thus the center opening through resilient washer 60 is of a slightly smaller diameter than the rod member 30 around which washer 60 must fit. This provides for a snug weather tight seal. Resilient washer 60 is approximately ⅛ inch thick. The diameter of resilient washer 60 is the same as the diameter of slidable plate member 70 and the steel washer 50.

A slidable plate member 70 is fit over resilient washer 60 to hold the fastener assembly 20 together as shown in FIG. 5. Slidable plate member 70 assures that rivet assembly 20 is securely held together even before being set. Slidable plate member 70 which is slidable in one direction only sandwiches resilient washer 60 between itself and steel washer 50. If steel washer 50 is not present, when the fastener 20 is set the slidable plate member 70 deflects slightly and causes a rather loose assembly. With the steel washer present as the assembly tool 28 applies pressure to the slidable plate member 70 this pressure is transmitted through resilient washer 60 to steel washer 50 which then applies pressure against flange 46 of sleeve 40 and the surface 26 of the materials 22, 24 and 26 being joined together. In the disclosed construction, the large steel washer 50 assures the items being connected remain sandwiched tightly.

The size of breakneck groove portion 32 of rod member 30 can be varied depending on the strength of the material used to form sleeve 40. When a steel sleeve is used a rod member 30 with a larger diameter of break off portion 32 is required. This larger break off diameter portion 32 is required to properly pleat the stronger steel material of the sleeve 40 before breaking off.

When the rivet is set, portion 38 of rod 30 remains captive within deformed sleeve 40. The materials to be joined are thus held together by: (1) the deformed sleeve; and (2) the rod member 40 acting through slidable plate member 70, resilient washer 60 and steel washer 50. Slidable plate member 70 and resilient washer 60 hold the fastener tightly together for various environmental conditions. Acting through steel washer 50 the slidable plate member 70 applies force to hold rivet 20 in place. The force applied by plate member 70 acts outside of the area defined by flange 46 of the deformed sleeve 40. When set, the fastener 20 thus has two separate means for holding the materials to be joined. Resilient washer 60 in conjunction with plate member 70 and steel washer 50 securely holds rod member 30 within deformed sleeve 40 and provides a weather tight seal.

Slidable plate member 70, as shown in detail in FIGS. 16 and 17, is slidable in one direction only. Slidable plate member 70 is disposed around a portion of rod member 30. Slidable plate member 70 has a flat planar peripheral portion 72 from which a plurality of spaced apart tongues 74 extend radially inward. Tongues 74 also extend at an angle with respect to the periphery portion 72. Tongues 74 thus generally point away from the enlarged head portion 36 of rod member 30 and thus plate member 70 can be slid in one direction only, towards enlarged head 36. An open space 76 is provided between the spaced apart tongue portions 74. As shown in FIG. 4 when the blind fastener 20 is installed, the slidable plate member 70 engages rod member 30 below the breakaway portion 32. Slidable plate member 70 resiliently and securely holds the remaining portion 38 of rod member 30 within and in contact with the hollow tubular sleeve 40. Blind rivet 20 is supplied as an assembly shown in FIG. 5 which is ready for use. Blind fastener 20 is inserted through the formed openings in the materials to be joined. An axial force is applied to rod member 30 by pulling tool 28, moving rod member 30 and setting sleeve member 40. As force continues to be applied, rod member 30 separates at breakneck portion 32. At this time the rivet 20 is set as shown in FIG. 4 with the remaining portion of rod member 30 securely held within deformed tubular member 40.

The disclosed blind fastener has superior holding strength as compared to prior art fasteners. The fastener remains tight under a wide variety of conditions. Another advantage of the disclosed fastener is that rod 30 is resiliently held in engagement with tubular member 40. This provides for secure holding of fastener 20 even when subjected to environmental variations. The slidable plate member 70, in conjunction with steel washer 50 transmits the holding force for rod 30 to an area outside of that defined by flange 46. This would not be the case if the rod was held in place only by the deformed tubular member 40 or if the holding plate 70 rested on the flange 46. This redundant dual holding feature wherein the holding force is provided both by the deformed sleeve 40 and the rod 30 acting in conjunction with steel washer 50, resilient washer 60 and slidable retaining plate 70 provides for a superior fastener. Resilient washer 60 which securely seals to rod member 30 provides for a fastener which is weather tight and well adapted for exterior joining of sheets, such as on the outside of a building.

What is claimed is:

1. A blind weather tight fastener for joining together two or more members having aligned openings formed therethrough comprising:
   a tubular member extending through the members to be joined having a flanged end portion which engages the outer member when the blind fastener is inserted through the aligned openings;
   a mandrel having a headed portion, defining an annular surface engaging the unflanged end of said tubular member to cause controlled collapsing of the unflanged end of said tubular member when an axial setting force, relative to said tubular member, is applied to said mandrel;
   a rigid metallic washer having a thickness greater than the thickness of the flange of said tubular member, having a counterbore formed in the center thereof to receive the flanged end of said tubular member, disposed on said mandrel with the flanged end portion of said tubular member positioned in the counterbore;
   a circular retainer, slidable in one direction only, disposed over the end of said mandrel, which projects from the flanged end of said tubular member, to resiliently hold said mandrel within said tubular member when the fastener is set;
   a resilient washer formed of resilient material sandwiched between said rigid metallic washer and said circular retainer having a diameter at least as great as said circular retainer and said rigid metallic washer; and,
   said rigid metallic washer having sufficient rigidity to transmit a holding force applied to its periphery to the flanged end of said tubular member to cause the collapse of said tubular member when the axial setting force is applied to the mandrel.

2. A blind fastener as claimed in claim 1 wherein:
   said tubular member includes a reduced diameter portion extending from a position intermediate the ends thereof to the unflanged end; and,
   the reduced diameter portion of said tubular member is tapered towards its unflanged end so that the unflanged end of the tubular member has the smallest cross section.

3. A blind fastener as claimed in claim 2 wherein:
   the taper formed on the reduced diameter portion of said tubular member is ¼°.

4. A blind fastener as claimed in claim 1 wherein:
   the portion of said tubular member extending through the members to be joined is of sufficient length so that when an axial force is applied to said mandrel the free end of said tubular member collapses into a plurality of pleats; and,
   said tubular member constructed so that as an axial force is applied to the mandrel to form the plurality of pleats the first pleat starts at the free end of the tubular member in contact with the annular surface of the mandrel and the pleats are sequentially formed from the free end of the tubular member towards the flanged end until the material to be joined is secured at one end by the flanged end of the tubular member and at the other end by the last pleat to be formed.

5. A blind fastener as claimed in claim 4 wherein:
   the diameter of each of the plurality of pleats formed after the first pleat is of a slightly larger diameter than the preceding pleat formed.

6. A blind fastener as claimed in claim 1 wherein:
   the annular surface formed on the headed portion of the mandrel slopes from the outer periphery towards the center and headed end of said mandrel;
   said tubular member includes a reduced diameter portion extending from a position intermediate the ends thereof to the unflanged end; and,
   the reduced diameter portion of said tubular member tapers to the unflanged end.

7. A blind fastener as claimed in claim 6 wherein:
   the sloped portion of the annular surface is 5° relative to the perpendicular of the longitudinal axis of said mandrel.

8. A blind fastener for joining at least two members comprising:
- a sleeve, having one end flanged, projecting through an opening formed in the materials to be joined with the flanged end contacting the outside member through which the fastener is installed;
- a rod extending through said sleeve, having an enlarged head portion disposed outside of the unflanged end of said sleeve, for partially collapsing said sleeve when an axial force is applied thereto;
- a rigid metal washer, having a counterbore formed therein, disposed around the portion of said rod extending from the flanged end of said sleeve with the flange of said sleeve disposed within the counterbore;
- a spacer of resilient material disposed around said rod in contact with said rigid metal washer;
- a retaining member disposed around said rod to permit said rod to move in one direction only, along its longitudinal axis, with respect to the retaining member and,
- said rigid metal washer engaging and holding in place the flanged end of said sleeve when force is applied to said rod relative to the periphery of said rigid metal washer to set the blind fastener.

9. A blind fastener as claimed in claim 8 wherein:
said rigid metal washer, said spacer of resilient material, and said retaining member, are all circular and of approximately the same diameter.

10. A blind fastener as claimed in claim 8 wherein:
said sleeve member is constructed to collapse into a plurality of circular pleats as an axial force is applied to said rod.

11. A blind fastener as claimed in claim 9 wherein:
the diameters of the plurality of pleats formed when the blind fastener is set decreases from the pleat engaging the material to be joined to the pleat engaging the enlarged rod head.

12. A blind fastener as claimed in claim 11 wherein:
the enlarged head portion of said rod defines an annular surface; and,
when the blind fastener is set the first pleat formed in said sleeve is formed at the end of said sleeve engaging the annular surface of said rod and the last pleat formed engages one of the members to be joined.

13. A blind fastener as claimed in claim 12 wherein:
said sleeve includes a tapered portion extending from a point intermediate the ends thereof to the unflanged end; and,
the annular surface of said rod is undercut for gripping and positioning the unflanged end of said sleeve.

14. A blind fastener as claimed in claim 13 wherein:
the tapered portion of said sleeve is formed on a portion of the sleeve which is of a reduced wall thickness.

15. A blind fastener as claimed in claim 14 wherein:
the taper formed on said sleeve is $\frac{1}{2}°$; and,
the undercut on the headed portion of said mandrel has a 5° slope.

16. A blind fastener comprising:
- a mandrel having one end enlarged to define an annular surface around the mandrel;
- a sleeve disposed around a portion of said mandrel having an unflanged end facing the annular surface of said mandrel and a flanged end separated from the enlarged end of said mandrel;
- a rigid metal washer disposed around said mandrel having a counterbore formed therein for receiving the flanged end of said sleeve and for transmitting a setting force applied to its periphery to the flanged end of said sleeve;
- a resilient washer disposed around said mandrel in proximity to said rigid metal washer; and,
- a plate member slidable in one direction only disposed around said mandrel to sandwich said resilient washer between itself and said rigid metal washer.

17. A blind fastener as claimed in claim 16 wherein:
the annular portion of said mandrel slopes from its outside circumference towards the longitudinal center and the enlarged end of said mandrel.

18. A blind fastener as claimed in claim 17 wherein:
the slope of the annular portion of said mandrel is 5° with respect to a perpendicular from the longitudinal axes.

19. A blind fastener as claimed in claim 18 wherein:
said sleeve has a reduced diameter portion formed intermediate the ends thereof extending to the unflanged end.

20. A blind fastener as claimed in claim 19 wherein:
said sleeve slope is $\frac{1}{2}°$ with respect to the longitudinal axes of said mandrel.

21. A blind fastener as claimed in claim 16 wherein:
said rigid metal washer, said resilient washer, and said plate member are all circular and of approximately the same diameter.

22. A blind fastener as claimed in claim 21 wherein:
said sleeve is formed of hot-rolled steel.

23. A blind fastener as claimed in claim 21 wherein:
said sleeve is formed of aluminum.

24. A blind fastener as claimed in claim 16 wherein:
the flange formed on said sleeve is circular and flat on the top and bottom; and,
said rigid metal washer is flat and circular.

25. A blind fastener as claimed in claim 24 wherein:
the diameter of said rigid metal washer is at least $2\frac{1}{2}$ times the diameter of the flanged end of said sleeve.

26. A blind fastener as claimed in claim 24 wherein:
said resilient washer and said plate member are circular and of the same diameter as said rigid metal washer.

27. A blind fastener for joining a plurality of surfaces having aligned openings formed therethrough comprising:
- a sleeve extending through the aligned openings having a flanged end for engaging the surface through which it is inserted and an unflanged end projecting from the surfaces;
- a mandrel extending through said sleeve having a headed portion with an annular surface which engages the unflanged end of said sleeve for collapsing a portion of said sleeve when a relative axial force is applied thereto and having a portion which extends from the flanged end of said sleeve when the rivet is set;
- holding means for holding the portion of said mandrel, which extends from the flanged end from one of the surfaces when the rivet is set, from one of the surfaces to be joined;
- said sleeve having a reduced diameter portion formed intermediate its end and extending to the unflanged end;
- the reduced diameter portion of said sleeve being tapered and of sufficient length so that when the rivet is set said sleeve collapses and three or more pleats are formed; and, said holding means comprises a rigid washer having a counterbore for receiving the flanged end of said sleeve and for holding said sleeve in place when the blind fastener is set; a retaining member disposed around said mandrel to permit said mandrel to move in one direction only, along its longitudinal axis, with respect to said retaining member; and, a spacer of resilient material disposed around said mandrel between and in contact with said rigid washer and said retaining member.

* * * * *